US012697710B2

(12) United States Patent
Saputra et al.

(10) Patent No.: US 12,697,710 B2
(45) Date of Patent: Aug. 4, 2026

(54) MOBILE PLATFORM AND MANIPULATOR BASE, AND SYSTEMS AND METHODS OF USING THE SAME

(71) Applicant: Dubai Future Foundation, Dubai (AE)

(72) Inventors: Roni Permana Saputra, Dubai (AE); Tarek Taha, Dubai (AE); Julian Ferling, Dubai (AE)

(73) Assignee: Dubai Future Foundation, Dubai (AE)

( * ) Notice: Subject to any disclaimer, the term of this patent is extended or adjusted under 35 U.S.C. 154(b) by 159 days.

(21) Appl. No.: 18/491,131

(22) Filed: Oct. 20, 2023

(65) Prior Publication Data

US 2024/0131685 A1    Apr. 25, 2024
US 2024/0227161 A9    Jul. 11, 2024

Related U.S. Application Data

(60) Provisional application No. 63/418,134, filed on Oct. 21, 2022.

(51) Int. Cl.
*B25J 5/00*      (2006.01)
*B25J 9/16*      (2006.01)
*G05D 1/617*      (2024.01)

(52) U.S. Cl.
CPC ............. *B25J 5/007* (2013.01); *B25J 9/1676* (2013.01); *G05D 1/617* (2024.01)

(58) Field of Classification Search
CPC .......... B25J 5/007; G05B 2219/39172; G05B 2219/40298; G05B 2219/40476; G05D 1/617

See application file for complete search history.

(56) References Cited

U.S. PATENT DOCUMENTS

| | | | | |
|---|---|---|---|---|
| 2012/0061155 A1* | 3/2012 | Berger | ................... | B25J 9/0006 |
| | | | | 180/21 |
| 2018/0072212 A1* | 3/2018 | Alfaro | ....................... | B60P 1/64 |
| 2021/0008710 A1* | 1/2021 | Kiyosawa | .............. | B25J 9/1035 |
| 2021/0094184 A1* | 4/2021 | Gilchrist | ................ | B25J 19/027 |
| 2023/0364810 A1* | 11/2023 | Riedel | ...................... | B25J 17/00 |

* cited by examiner

*Primary Examiner* — Nhi Q Bui

(74) *Attorney, Agent, or Firm* — Tucker Ellis LLP; Ross M. Kowalski

(57) ABSTRACT

Devices and systems for performing an operation are provided. The system comprises a mobile platform comprising a frame having side supports and a rear support, side wheel assemblies coupled to the side supports, and a rear wheel assembly coupled to the rear support. The wheel assemblies each comprise wheels and a wheel frame, the wheel frame being pivotally connected to the side and rear supports. The system further comprises a first control system for controlling movement of the mobile platform and a manipulator element coupled to the mobile platform. The manipulator element is configured to removably connect to the mobile platform and to perform an operation. The manipulator element comprises a second control system for controlling the operation. The first control system and the second control system are configured to communicate to cause the mobile platform to move and to cause the manipulator element to perform the operation.

18 Claims, 14 Drawing Sheets

204

310

310

310

204

312

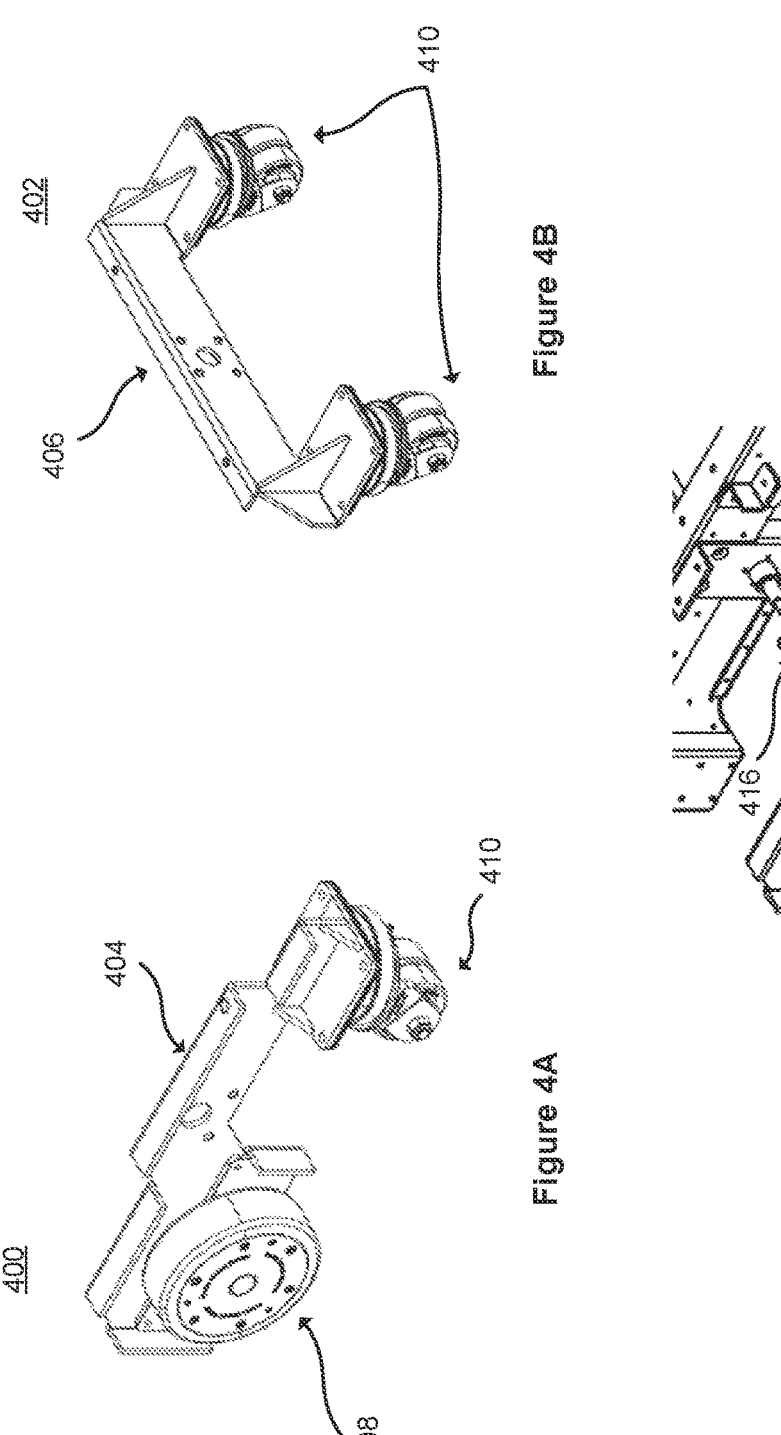
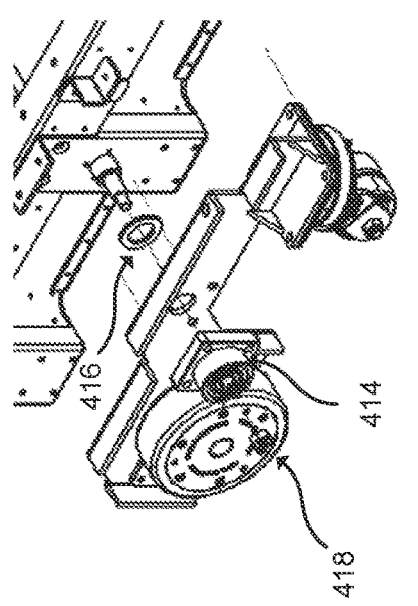
Figure 4B
Figure 4A
Figure 4C

100

100

602

100

800

700

602

800

100

700

1100

1200

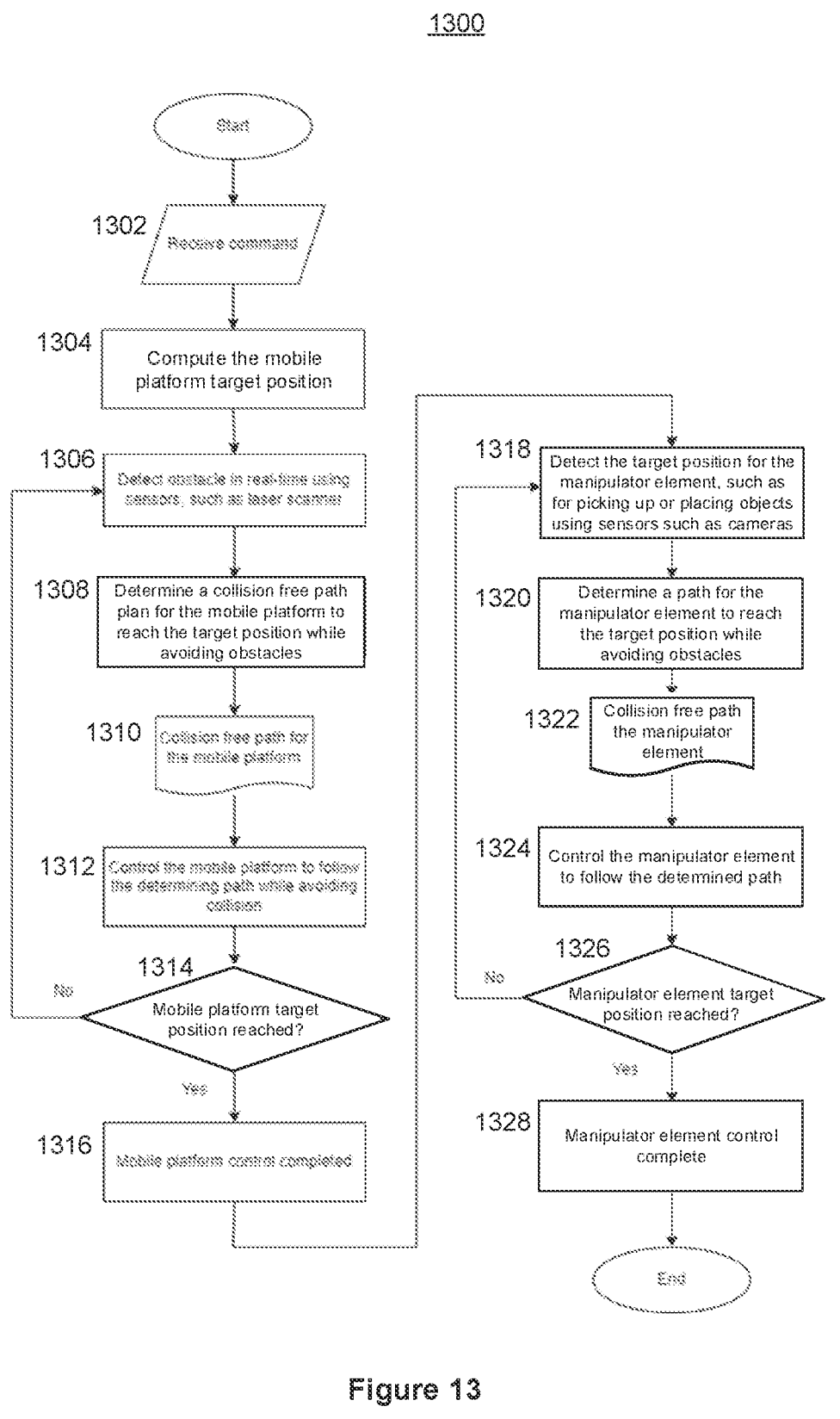

1300

Start

1302 Receive command

1304 Compute the mobile platform target position

1306 Detect obstacle in real-time using sensors, such as laser scanner

1308 Determine a collision free path plan for the mobile platform to reach the target position while avoiding obstacles 1310 Collision free path for the mobile platform 1312 Control the mobile platform to follow the determining path while avoiding collision 1314 Mobile platform target position reached?

No

Yes

1316 Mobile platform control completed

1318 Detect the target position for the manipulator element, such as for picking up or placing objects using sensors such as cameras 1320 Determine a path for the manipulator element to reach the target position while avoiding obstacles 1322 Collision free path the manipulator element 1324 Control the manipulator element to follow the determined path 1326 Manipulator element target position reached?

No

Yes

1328 Manipulator element control complete

End

Figure 13

MOBILE PLATFORM AND MANIPULATOR BASE, AND SYSTEMS AND METHODS OF USING THE SAME

CROSS-REFERENCE TO RELATED APPLICATIONS

This application claims priority to U.S. Ser. No. 63/418,134, entitled MOBILE PLATFORM AND MANIPULATOR BASE, AND SYSTEMS AND METHODS OF USING THE SAME, filed Oct. 21, 2022, all of which is incorporated herein by reference.

FIELD OF INVENTION

The present disclosure relates to a mobile platform, a manipulator base, and in particular to a mobile platform and manipulator base assembly with robotic manipulator attachments.

BACKGROUND

Ground mobile robots, particularly wheeled mobile robots, are used in many field applications, as industrial robots and service robots, leveraging their stability and manoeuvrability operating on a relatively flat terrain. Even though many of the applications of these ground mobile robots assumes that the robots will operate on a flat terrain, in many cases, the mobile robot also needs to be able to deal with a certain variation of the terrain such as slopes, small steps or curbs.

There is a need to improve the ability to maintain stable support and stable motion in the presence of terrain fluctuation in current mobile robot designs. This may become more difficult to maintain in cases of mobile robots with attachments or that are larger and heavier for particular applications. A ground mobile robot design should achieve good performance in many applications such as goods and objects transportation and universal mobile pick and pack functions, on flat and uneven terrains.

Accordingly, an additional, alternative, and/or improved mobile robot is desired.

SUMMARY

In accordance with one aspect of the invention, a system for performing an operation is disclosed, the system comprising a mobile platform comprising a frame having side supports and a rear support, side wheel assemblies coupled to the side supports, a rear wheel assembly coupled to the rear support, where the side and rear wheel assemblies each comprise at least two wheels and a wheel frame, the wheel frame being pivotally connected to the side and rear supports, and a first control system for controlling movement of the mobile platform. The system further comprises a manipulator element removably coupled to the mobile platform, wherein the manipulator element is configured to removably connect to the mobile platform and to perform the operation, the manipulator element comprising a second control system for controlling the operation, wherein the first control system and the second control system are configured to communicate to cause the mobile platform to move and the manipulator element to perform the operation.

The system may further comprise a base configured to removably connect to the mobile platform, and removably connect to the manipulator element.

In accordance with another aspect of the invention, a mobile platform is disclosed, the mobile platform comprising a frame have side supports and a rear support, side wheel assemblies coupled to the side supports, and a rear wheel assembly coupled to the rear support. The side and rear wheel assemblies each comprise at least two wheels and a wheel frame, and the wheel frame being pivotally connected to the side and rear supports.

The mobile platform may further comprise a control system for controlling actuation of the wheels and movement of the mobile platform, and one or more sensors for detecting obstacles before and during movement of the mobile platform.

The mobile platform may further comprise a connection port on a surface of the mobile platform configured to removably connect to a manipulator element.

In accordance with another aspect of the invention, a method of controlling a mobile platform is disclosed, the method comprising receiving, by a processor of the mobile platform, a signal to move to a location, detecting, by sensors of the mobile platform, obstacles that are present between the mobile platform and the location, if no obstacles are detected, transmitting signals to wheel assemblies of the mobile platform to actuate wheels of the wheel assemblies, and if obstacles are detected, determining a path for the mobile platform to avoid the obstacles.

The method may further comprise transmitting, by the processor, a signal to a processor of a robotic arm to move the robotic arm into a predetermined position, when the mobile platform arrives at the location, transmitting a signal to the processor of the robotic arm to perform an operation, detecting, by sensors of the robotic arm, obstacles that are present between the robotic arm and an area for the operation, if no obstacles are detected, actuating the robotic arm to perform the operation, and if obstacles are detected, determining movement of the robotic arm to avoid the obstacles.

BRIEF DESCRIPTION OF THE DRAWINGS

Further features and advantages of the present disclosure will become apparent from the following detailed description, taken in combination with the appended drawings, in which:

FIG. 4A depicts an embodiment of a side rocker arm of the mobile platform;

FIG. 4B depicts an embodiment of a rear rocker arm of the mobile platform;

FIG. 4C depicts a magnified view of a side wheel assembly of FIG. 2B;

FIG. 13 depicts a flowchart of a sequential control method of the mobile manipulator.

DETAILED DESCRIPTION

A mobile platform for various applications and for attaching different elements such as manipulator elements to is described. The mobile platform comprises a frame have side supports and a rear support, side wheel assemblies coupled to the side supports, and a rear wheel assembly coupled to the rear support. The side and rear wheel assemblies each comprise at least two wheels and a wheel frame, where the wheel frame is pivotally connected to the side and rear supports. A system for performing an operation is provided. The system comprises the mobile platform, which comprises a first control system, and a manipulator element removably coupled to the mobile platform, the manipulator element comprising a second control system for controlling the operation. The first control system and the second control system are configured to communicate to cause the mobile platform to move and the manipulator element to perform the operation.

Figure 1A:
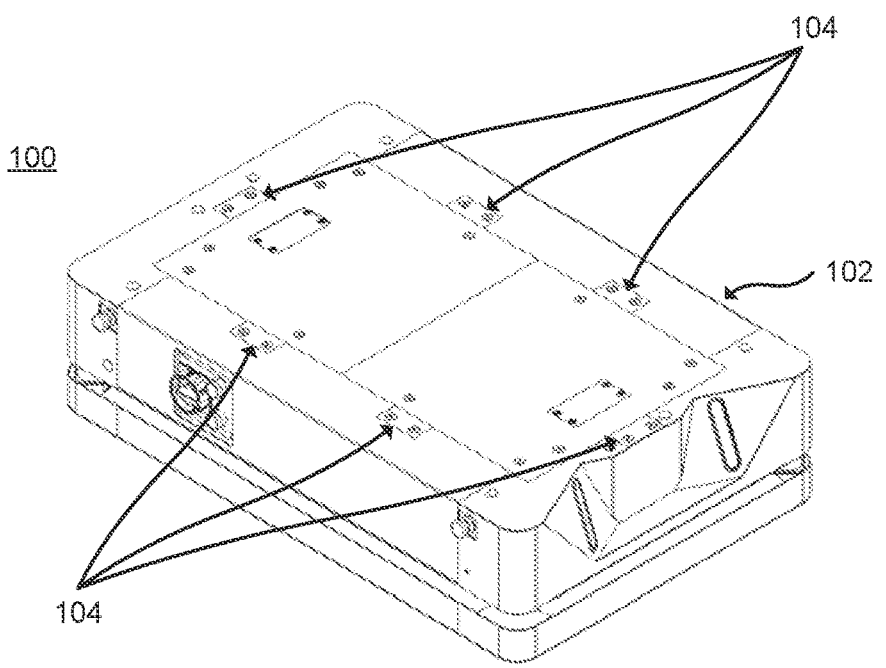
FIGS. 1A and 1B depict a front perspective view and a rear perspective view, respectively, of an embodiment of a mobile platform.
Figure 1B:
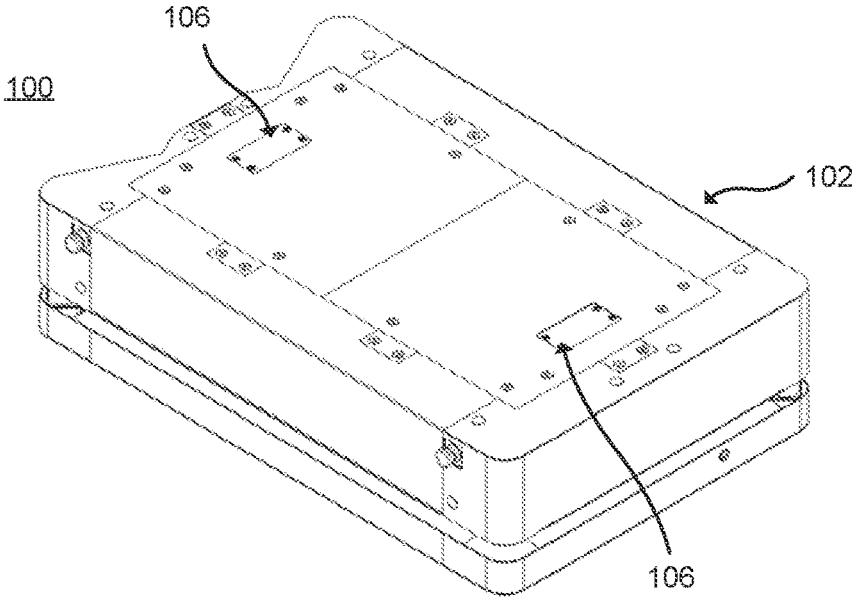

FIGS. 1A and 1B depict a front perspective view and a rear perspective view, respectively, of an embodiment of a mobile platform 100. The mobile platform 100 may be a robotic platform base that moves on different terrains for various applications such as carrying payloads, moving objects over terrains, etc. The mobile platform 100 comprises systems for moving the platform 100, attaching various components or elements to the platform 100, and for communications between, for example, the platform 100 and any attached components or elements. The various components or elements may be attached or secured to a surface of the mobile platform 100, such as at attachment locations 104. The various components or elements may be attached to one or more of the attachment locations 104 via, for example, at least two threaded holes present at each attachment location 104. The mobile platform 100 further comprises external hubs 106 that may provide external power ports and data ports for various attached components or elements.

Figure 2A:
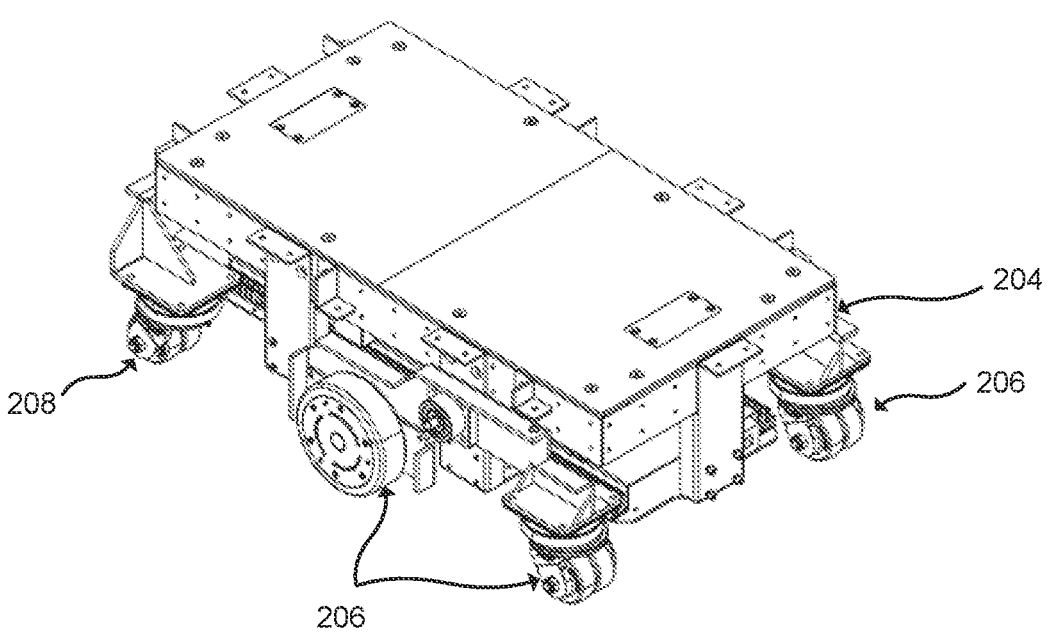
FIG. 2A depicts an embodiment of the mobile platform.
Figure 2B:
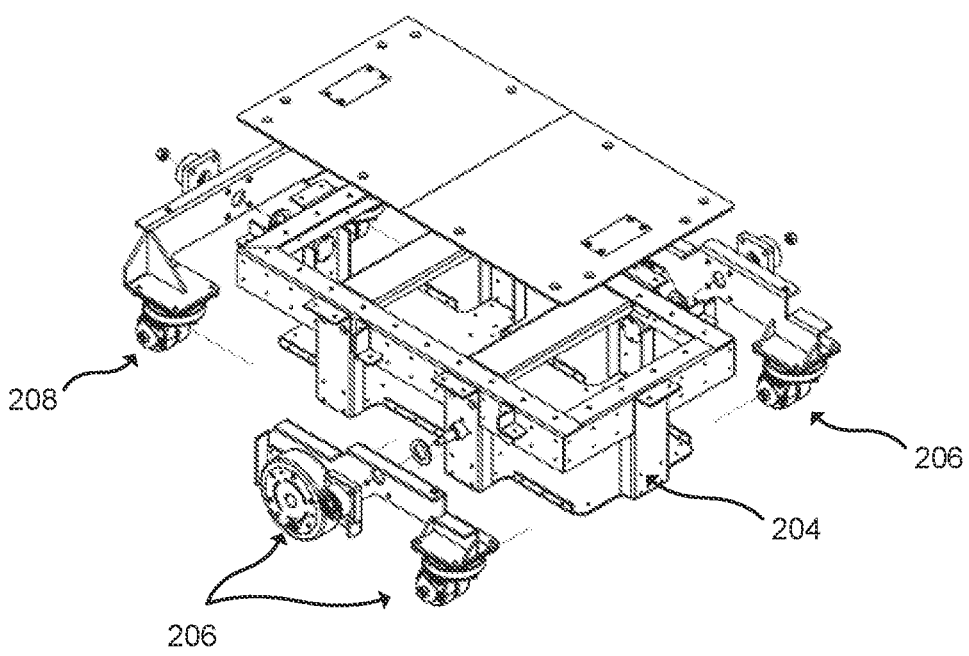
FIG. 2B depicts an exploded view of the mobile platform of FIG. 2A.

FIG. 2A depicts an embodiment of the mobile platform 100 with only a top of the cover 102. FIG. 2B depicts an exploded view of the mobile platform 100 of FIG. 2A. The mobile platform 100 comprises a main chassis or frame 204, side wheels 206 and rear wheels 208. The side wheels 206 and rear wheels 208 are coupled to the frame 204 at support points. The mobile platform 100 may further comprise various computer hardware components and motors (not depicted) to control movement of the wheels 206, and sensors (not depicted) such as cameras or lasers, to detect objects around the mobile platform 100 while parking or while moving.

Figure 3B:
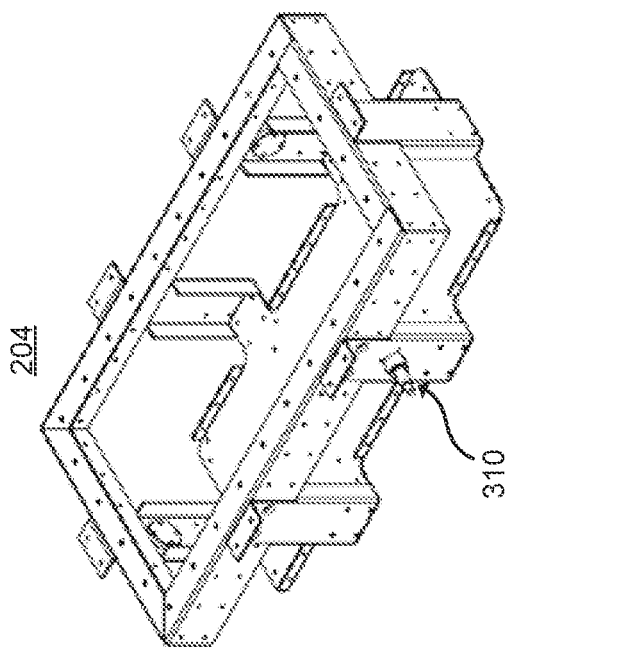
FIGS. 3A and 3B depict a top view and a front perspective view, respectively, of an embodiment of a frame of the mobile platform.
Figure 3A:
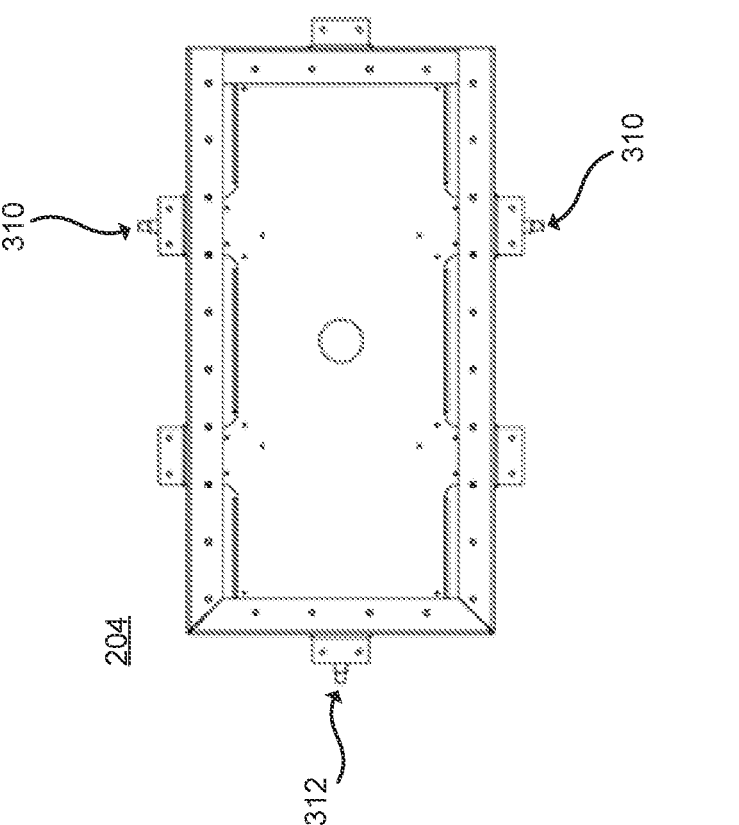

FIGS. 3A and 3B depict a top view and a front perspective view, respectively, of an embodiment of frame 204. The frame 204 may be formed of one single component, or may be formed of two or more components secured together. The frame 204 comprises side support points 310, and a rear support point 312. In some embodiments, the frame 204 may comprise a front support point with front wheels instead of the rear support. The side support points 310 are positioned on the frame 204 such that the weight of the mobile platform 100 (including attachments in some cases) is uniformly distributed to all wheels 106, 108. The rear support point 312 is positioned on the frame 204 to ensure a balance between the sides of the mobile platform 100.

The wheels 206, 208 are couple to the frame 204 via the support points 310, 312, and wheel assemblies. FIG. 4A depicts a side wheel assembly 400, and FIG. 4B depicts a rear wheel assembly 402. The wheel assemblies 400, 402 comprise a wheel frame 404, 406, a driving wheel 408, and supporting wheels 410. The wheel assemblies 400, 402 allow for rocking movement at the support points 310, 312, and provide stability for the mobile platform by ensuring good weight distribution through the wheels such that all of the wheels touch the ground.

The rocking movement of the wheel assemblies allows for the mobile platform to move on various types of terrains. For example, if the mobile platform 100 moves towards an area where there is a bump or step in the ground, the rocker movement of the side wheel assemblies 400 allows the mobile platform to continue moving such that the support wheel 410 moves up onto the bump or step, and the driver wheel 408 continues to touch the ground. The wheel assemblies 400, 402 allow for terrain adaptability in both lateral and longitudinal directions through the rocker movement which allows for local self-adjustment of the wheel assemblies and passive adjustment of the wheel assembly suspension mechanisms.

FIG. 4C depicts a magnified view of a side wheel assembly 400 of FIG. 2B. The wheel assemblies 400, 402 are coupled to the frame 204 at the support points 310, 312 via the wheel frames 404, 406. The wheel assemblies 400, 402 further comprise bearings and fasteners to pivotally connect the wheel assemblies 400, 402 to the frame 204. The bearings comprise a flange mounted radial bearing 414 and a thrust bearing 416. The fasteners comprise a locking fastener 418 to lock the wheel assembly 400 to the pivot axle and to prevent axial movement of the assembly.

The pivotal connection between the wheel assemblies 400, 402 allows for the wheel frames 404, 406 to pivot at the support points 310, 312. This allows for an improved movement stability of the mobile platform and allows for the driving wheels 408 to contact the ground on flat and on uneven terrains. The pivoting connection further allows for self-adjustment of the wheel frames 404, 406 with respect to the condition of the terrain the mobile platform is moving on.

The wheel assemblies 400, 402 may be easily assembled to and disassembled from the frame 204. The structure of the wheel assemblies 400, 402 allow for customization of the assemblies for different applications and different payloads on the mobile platform 100. They further provide a compact structure while maintaining the pivot joint stiffness and minimizing displacement of the assemblies in the lateral direction.

Figure 5A:
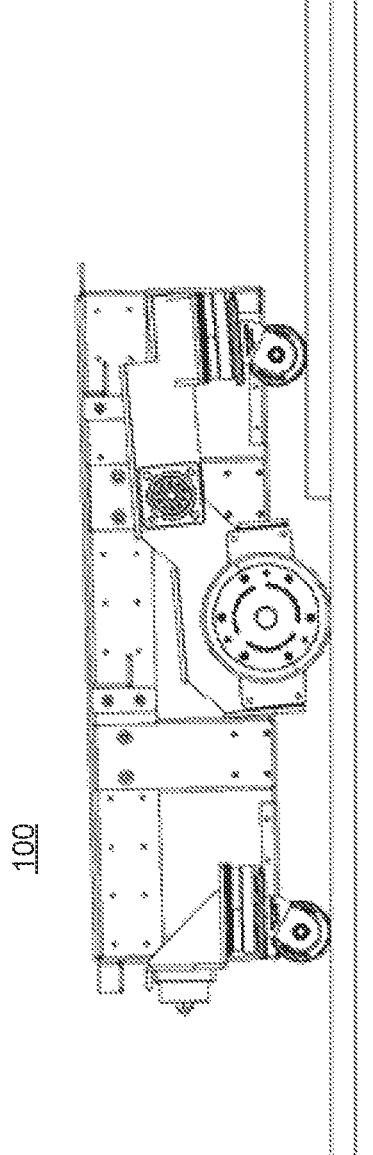
FIGS. 5A and 5B depicts the mobile platform base on uneven terrains.
Figure 5B:
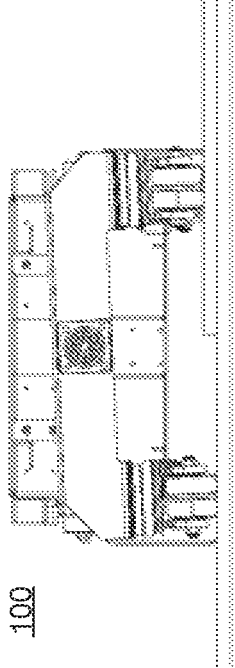

FIGS. 5A and 5B depicts the mobile platform 100 without the side cover on uneven terrains. As depicted in FIG. 5A and described above, as the mobile platform 100 moves onto or over a step or bump, the wheel frame 404 pivots or rocks such that the support wheel 410 and the driver wheel 408 are touching the ground. Similarly, as depicted in FIG. 5B, as the mobile platform 100 moves onto a terrain where the right or left side of the mobile platform 100 is higher such as a bump or a step, the wheel frame 406 pivots or rocks such that both supporting wheels 410 of the rear wheel assembly 402 are touching the ground, along with the wheels 408, 410 of the side wheel assemblies 400.

Figure 6A:
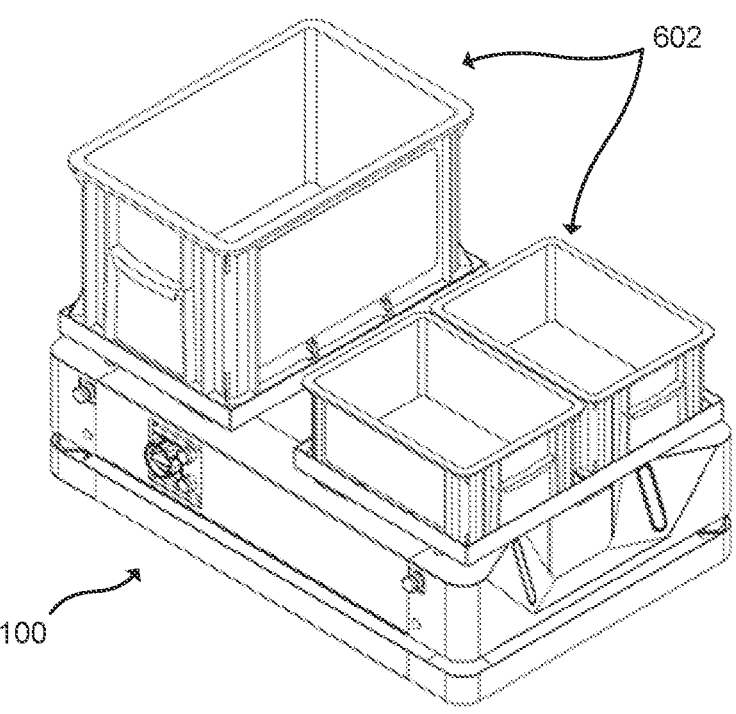
FIGS. 6A and 6B depict an embodiment of the mobile platform carrying bins or storage elements.
Figure 6B:
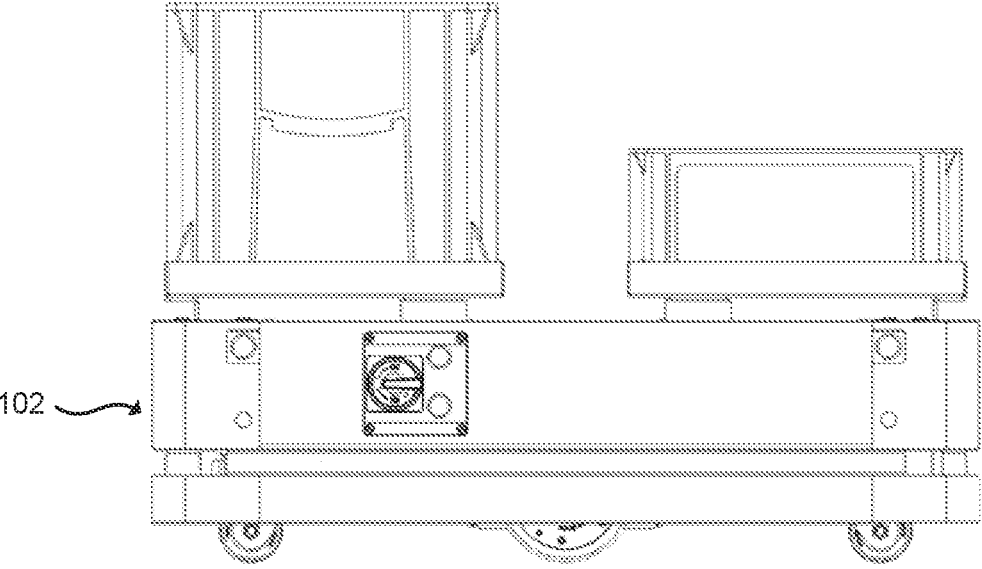

FIGS. 6A and 6B depict an embodiment of the mobile platform 100 carrying bins or storage elements 602. As described above, the mobile platform 100 may be used to carry payloads for material handling and transportation. The cover 102 of the mobile platform 100 may comprise attachment elements such as hooks or plugs for different elements to connect to for safe transportation and handling. For example, a bin holder may connect to the cover 102 at two or more attachments locations 104, as depicted, and various bins may be placed into the bin holder. The bin holder may be secured to the mobile platform 100 via bolts that are fastened into the threaded holes of the attachment locations 104.

In some embodiments, a manipulator element for a different application may be attached or secured to the mobile platform 100. The manipulator element may be an arm or other means for grabbing objects. For attaching or securing such a manipulator element to the mobile platform 100, a manipulator base may be used.

Figure 7A:
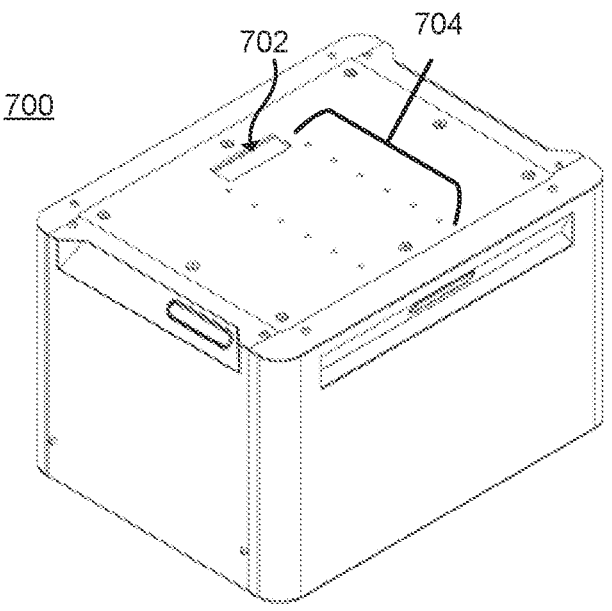
FIGS. 7A and 7B depict a front perspective view and a rear perspective view, respectively, of an embodiment of a manipulator base.
Figure 7B:
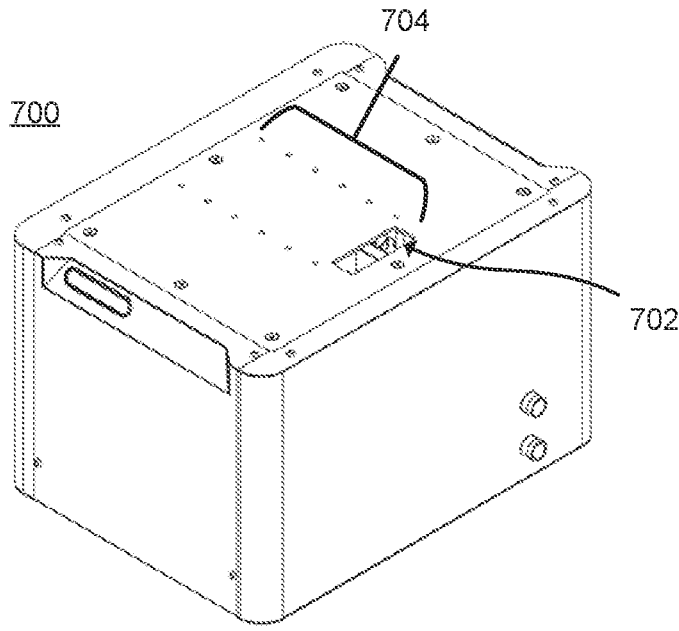

FIGS. 7A and 7B depict a front perspective view and a rear perspective view, respectively, of an embodiment of a manipulator base 700. The manipulator base 700 attaches to the cover 102 at two or more attachments locations 104 of the mobile platform 100. The manipulator base 700 may be secured to the mobile platform 100 via bolts that are fastened into the threaded holes of the attachments locations 104. In some embodiments, the manipulator base 700 may be permanently attached to the mobile platform 100 and secured using bolted joints on the attachment locations 104.

The manipulator base 700 further connects to the mobile platform 700 via an external hub 106. The manipulator base 700 may connect to one external hub 106, or may connect to more than one external hub 106. The external hub 106 can provide power supply for the manipulator base and for a manipulator element. The external hub may further provide a communication link and control signal so that the mobile platform 100 and the manipulator base 700 can communicate and operate together.

The manipulator base 700 comprises a connection port or external hub 702 and attachment locations 704 for a manipulator element to connect to. The attachment locations 704 comprise threaded holes which a manipulator element may be fastened to. In some embodiments the manipulator element may be removably secured or fastened to the manipulator base 700. In other embodiments, the manipulator element may be permanently attached or secured to the manipulator base 700 with bolted joints at two or more of the attachment locations 704. It will be appreciated that there may be a plurality of the attachment locations 704 to allow for a manipulator element to be placed in a position most appropriate for the operation the manipulator element will be used for. The manipulator base 700 may further comprise various computer hardware components (not depicted) to control movement of the manipulator element, and sensors (not depicted) such as cameras or lasers, to detect objects around the mobile platform 100 and the manipulator element while the mobile platform 100 is parked and/or moving, as well as when the manipulator element is operating.

Figure 8B:
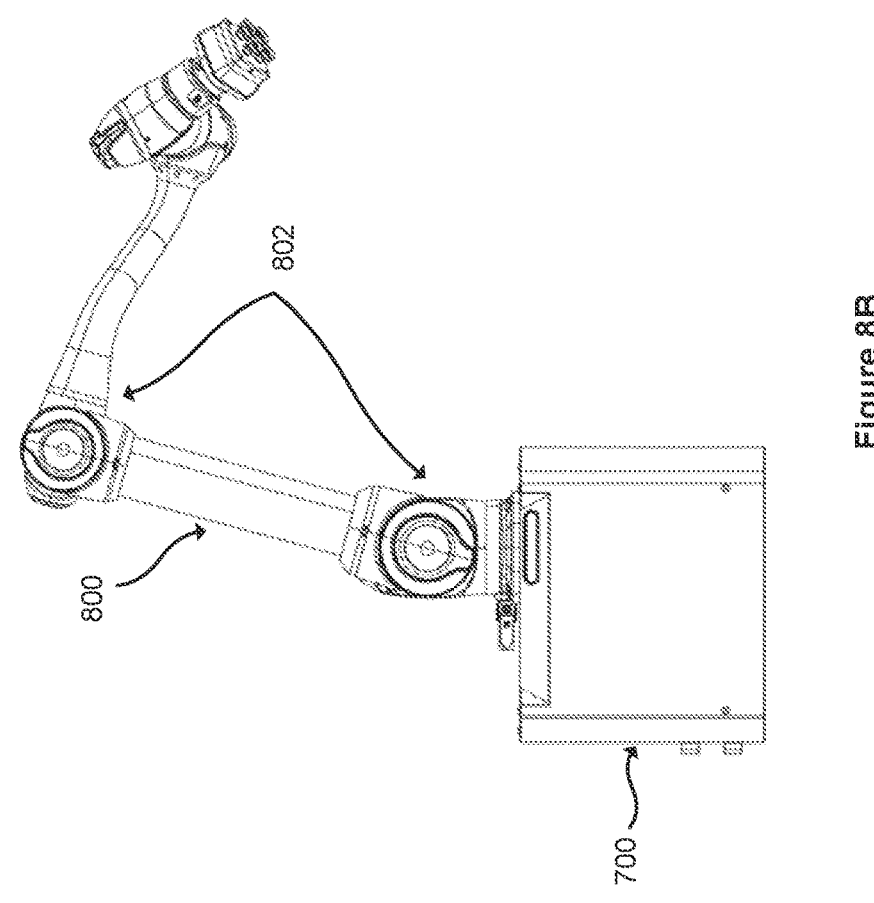
FIGS. 8A and 8B depict an embodiment of the manipulator base with a robotic arm attachment.
Figure 8A:
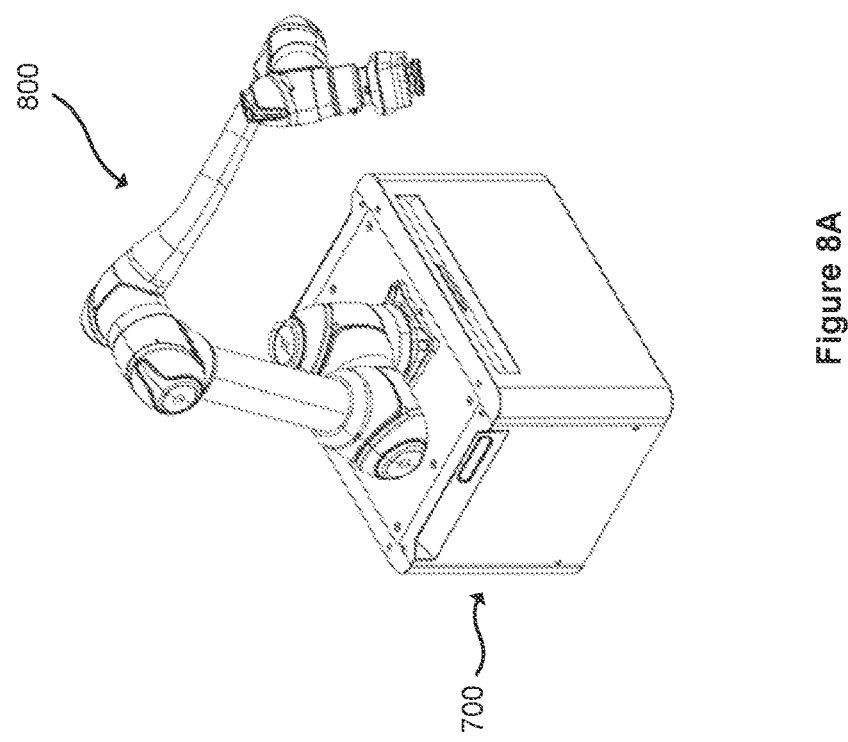

FIGS. 8A and 8B depict an embodiment of the manipulator base 700 with a manipulator element attached thereto. The manipulator element depicted is a robotic arm attachment 800. The arm 800 connects to the manipulator base 700 at two or more of the attachment locations 704 and at the external hub 702.

The robotic arm attachment 800 may be configured to pick up and hold onto objects, and to release or place objects at or onto a particular point. The robotic arm attachment 800 comprises various sensors and motors for moving the arm 800 into positions for grabbing objects, holding the objects, and releasing the objects. The sensors may comprise cameras or laser to detect any objects to ensure the arm 800 does not hit or damage anything while moving, to detect the objects to be picked up, and to detect to the particular point for releasing the object. The arm 800 may comprise joints such as joints 802 for allowing the arm to extend and access areas further from the platform 100 or base 700. The robotic arm 800 comprises motors and hardware components to control the movement of the arm 800.

Figure 9B:
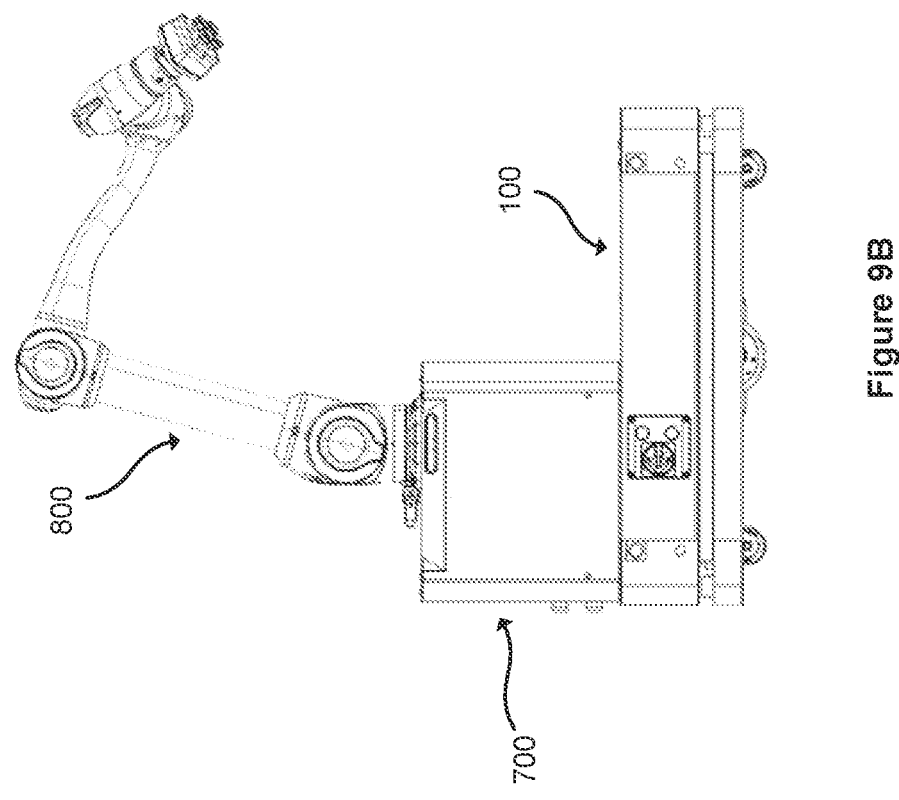
FIGS. 9A and 9B depict the manipulator base with the robotic arm attachment on the mobile platform base.
Figure 9A:
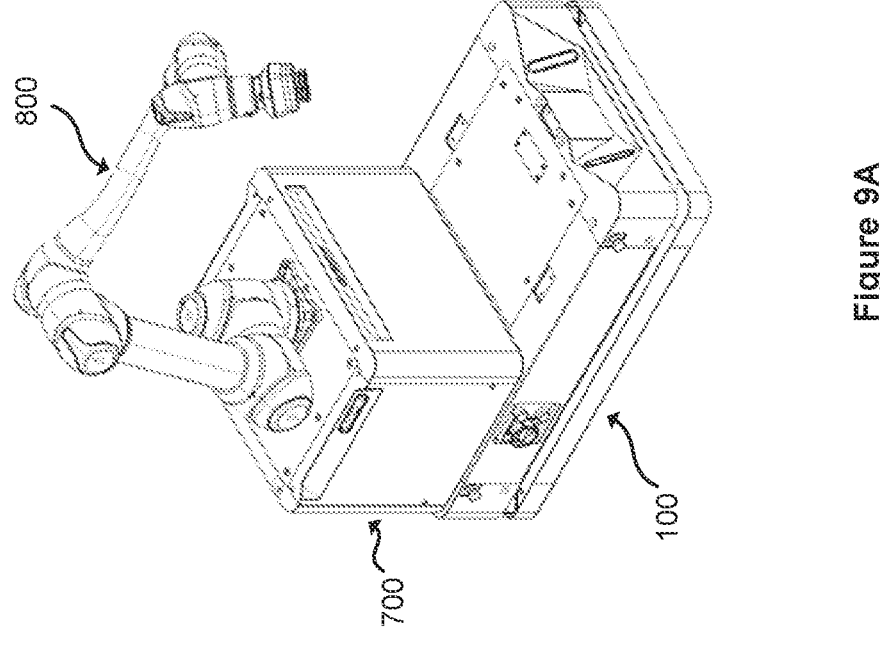
Figure 10B:
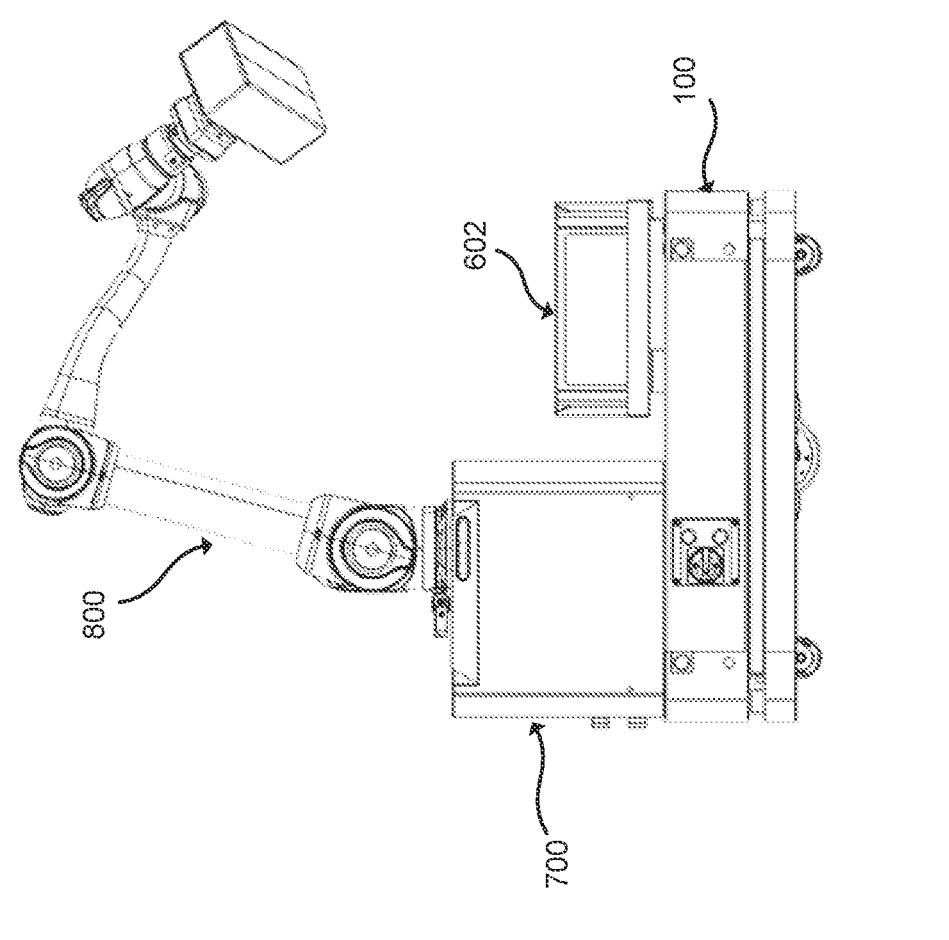
FIGS. 10A and 10B depict the manipulator base with the robotic arm attachment and bins or storage elements on the mobile platform base.
Figure 10A:
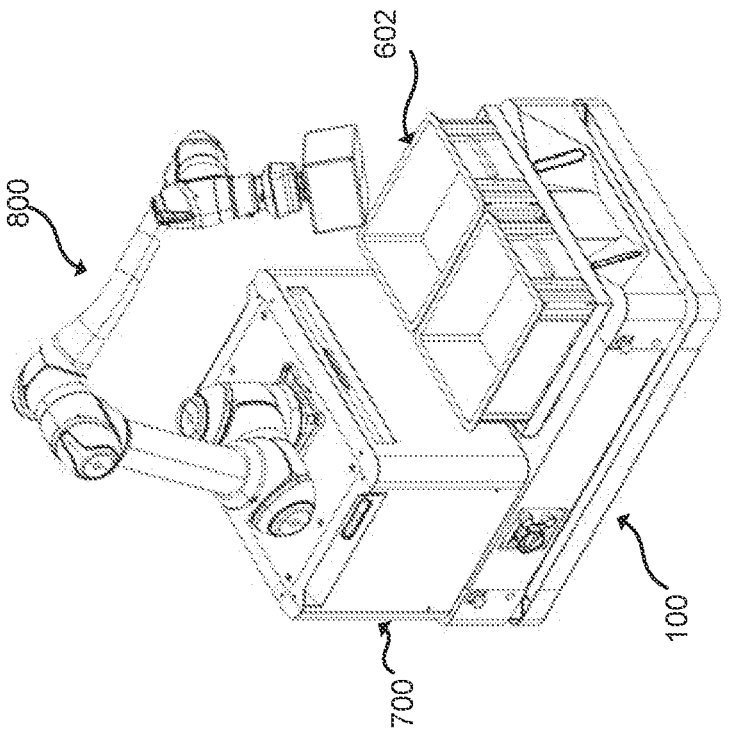

FIGS. 9A and 9B depict the manipulator base 700 with the robotic arm attachment 800 on the mobile platform 100. FIGS. 10A and 10B depict the manipulator base 700 with the robotic arm attachment 800 and bins or storage elements 602 on the mobile platform 100. The manipulator base 700 and robotic arm 800 comprise a control system for controlling the movement of the arm 800. The control system may be located in the manipulator base 700. The control system communicates with the sensors to detect objects and areas, and may communicate with a remote controller to receive and transmit signals for controlling the arm 800. In some embodiments, the control system of the robotic arm 800 and manipulator base 700 comprises a stored program for controlling the robotic arm 800.

Similarly, the mobile platform 100 comprises a separate control system for controlling movement of the mobile platform 100. The control system communicates with the sensors of the mobile platform to detect objects and areas to move to or away from, and may communicate with a remote controller to receive and transmit signals for controlling the mobile platform 100. The control system further allows for path planning and autonomous navigation of the mobile platform 100 and controls the driving wheels 408. In some embodiments, the control system of the mobile platform 100 comprises a stored program for controlling the mobile platform 100. In other embodiments, the control systems of the mobile platform 100 and/or the robotic arm 800 and manipulator base 700 may be controlled by a user at a remote location. It will be appreciated that the control system of the mobile platform 100 and/or the manipulator base 700 may comprise a stored program for an autonomous mode and may be controlled by a user at a remote location for a teleoperation mode.

When the robotic arm 800 and the manipulator base 700 are connected to the mobile platform 100, the control systems of each of the arm 800 and the mobile platform 100 are configured to communicate with each other to control and coordinate the movement of the mobile platform 100 and the robotic arm 800. For example, in some embodiments, the robotic arm 800 may be configured to move into a parked or resting position, as depicted in FIG. 9A, when the mobile platform is moving. This may be done to further improve the stability of the mobile platform 100. In other embodiments, the arm 800 and the mobile platform 100 may be configured to move at the same time, where each system is configured to detect and avoid any obstacles.

As depicted in FIGS. 9A, 9B, 10A, and 10B, the manipulator base 700 and robotic arm 800 and/or the storage bins 602 add height and weight to the mobile platform 100. The frame 204 and wheel assemblies 400, 402 are configured to evenly distribute the weight of each of the elements on the wheels 408, 410, and are configured to provide stability with the additional weight and height. To ensure the weight is evenly distributed and to provide the stability, the mobile platform 100 may further comprise counterweights depending on the application of the mobile platform 100.

To avoid any obstacles, the control systems of the mobile platform 100 and the robotic arm 800 and manipulator base 700 are configured to detect any obstacles via images from the cameras and/or via the lasers. The control systems are configured to process the images or information from the lasers to detect any obstacles, and to send signals to direct the arm 800 and mobile platform 100 away from the detected obstacles.

Figure 11:
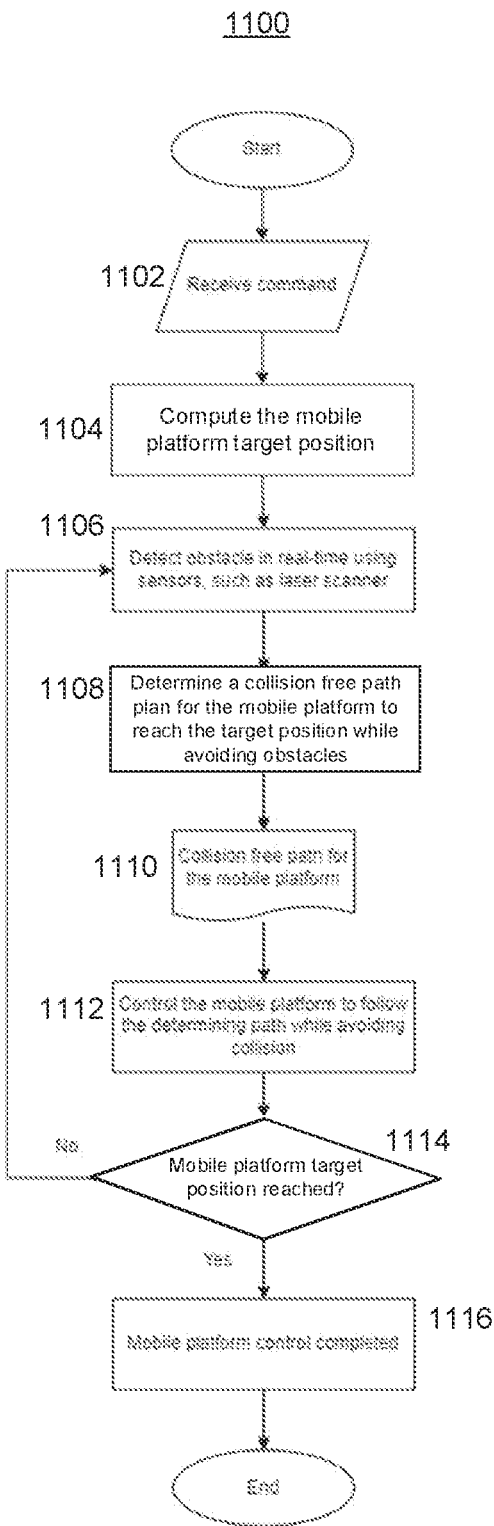
FIG. 11 depicts a flowchart of a control method of the mobile platform.

FIG. 11 depicts a flowchart of a control method 1100 of the mobile platform 100. The mobile platform 100 has an independent computation system for controlling the mobility of the mobile platform, including controlling the driving wheels 408 for the robot mobility, obstacle detection and avoidance, path planning and autonomous navigation, and other controls for the mobile platform.

The control method of the mobile platform receives a command (1102), via the stored program or from a remote user, to, for example, move to a particular location. The mobile platform target position is then computed (1104) for the particular location. The control system is configured to detect obstacles in real-time using sensors (1106), and to determine a collision free path for the mobile platform to travel to reach the target position while avoiding any obstacles (1108). The plan for the collision free path is determined (1110) and the mobile platform controls the driver wheels to follow the determined collision free path (1112). Once the mobile platform has reached the target position (1114), the mobile platform control is complete (1116), and additional signals or commands may be sent to the control system of the mobile platform and/or the manipulator base. If the mobile platform has not yet reached the target position (1114), due to for example, an obstacle or the path plan ending before the target position is reached, the system returns to step 1106 to detect obstacles and plan a collision free path for the mobile platform to reach the target position.

Figure 12:
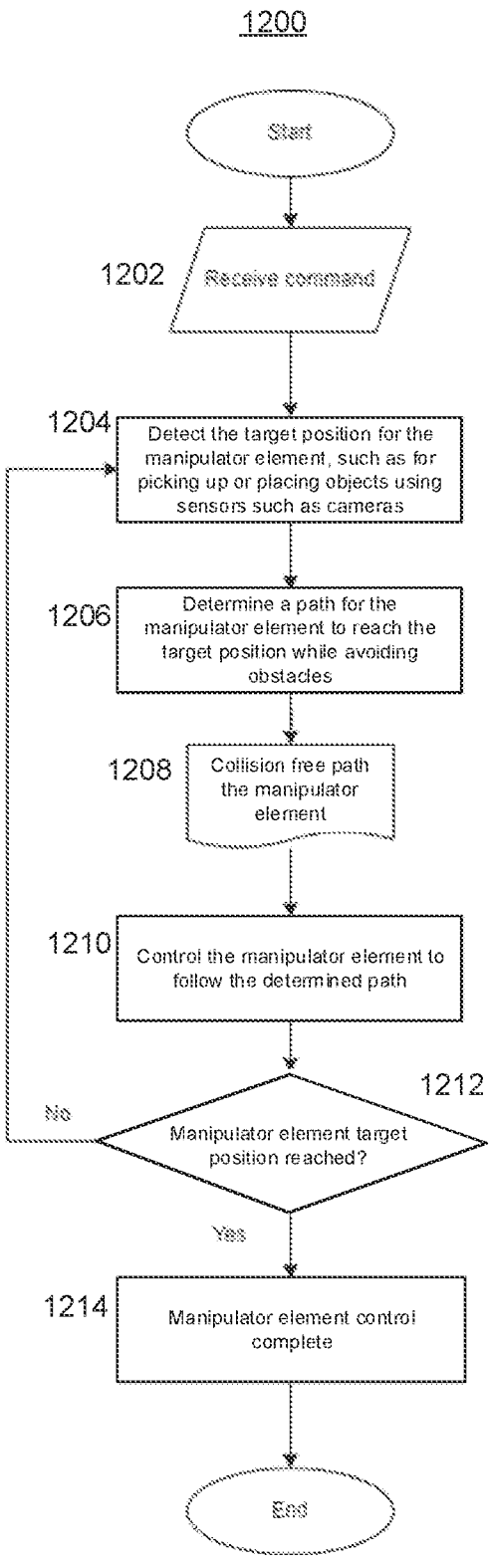
FIG. 12 depicts a flowchart of a control method for the manipulator base.

FIG. 12 depicts a flowchart of a control method 1200 for the manipulator base 700. The manipulator base 700 has an independent computation system for controlling a manipulator element, such as the robotic arm, including controlling the robotic arm, detecting objects to be for example picked up and placed, detecting objects around the robot, path planning for an operation of the robotic arm with obstacle avoidance, and other controls for the robotic arm.

The control method of the manipulator base 700 receives a command (1202), via the stored program or from a remote user, to, for example, pick up or place a particular object. The manipulator element target position is then detected (1204) using the sensors of the manipulator element and manipulator base for the particular object. The control system is configured to determine a path for the manipulator element to travel to reach the target position while avoiding any obstacles (1206). The plan for the path is determined (1208) and the manipulator base controls the manipulator element to follow the determined path (1210) to for example pick up or place the object. Once the manipulator element has reached the target position (1212), the manipulator base control is complete (1214), and additional signals or commands may be sent to the control system of the mobile platform and/or the manipulator base. If the manipulator element has not yet reached the target position (1212), due to for example, an obstacle or the path plan ending before the target position is reached, the system returns to step 1204 to detect the target position of the manipulator element and plan a path for the manipulator element to reach the target position while avoiding any obstacles.

When the manipulator base with a manipulator element, such as a robotic arm, is attached or secured to the mobile platform, the computation modules in the mobile platform can act as a master that communicates with the computation module in the manipulator base, so that the mobile platform and the manipulator element can operate and synchronize together. The mobile platform with the manipulator base and robotic arm or other manipulator element may also be referred to as the mobile manipulator. The mobile manipulator system can be controlled using a sequential control or a simultaneous control.

FIG. 13 depicts a flowchart of a sequential control method 1300 of the mobile manipulator. The control method of the mobile platform and/or the manipulator base receives a command (1302), via the stored program or from a remote user, to, for example, move to a particular location to pick up or place a particular object. The mobile platform target position is then computed (1304) for the particular location. The control system is configured to detect obstacles in real-time using sensors (1306), and to determine a collision free path for the mobile platform to travel to reach the target position while avoiding any obstacles (1308). The plan for the collision free path is determined (1310) and the mobile platform controls the driver wheels to follow the determined collision free path (1312). Once the mobile platform has reached the target position (1314), the mobile platform control is complete (1316). If the mobile platform has not yet reached the target position (1314), due to for example, an obstacle or the path plan ending before the target position is reached, the system returns to step 1306 to detect obstacles and plan a collision free path for the mobile platform to reach the target position.

Once the mobile platform has reached the target position, the control system of the manipulator base is configured to detect a target position of the manipulator element (1318) using the sensors of the manipulator element and manipulator base for the particular object. The control system is configured to determine a path for the manipulator element to travel to reach the target position while avoiding any obstacles (1320). The plan for the path is determined (1322) and the manipulator base controls the manipulator element to follow the determined path (1324) to for example pick up or place the object. Once the manipulator element has reached the target position (1326), the manipulator base control is complete (1328), and additional signals or commands may be sent to the control system of the mobile platform and/or the manipulator base for any additional operations. If the manipulator element has not yet reached the target position (1326), due to for example, an obstacle or the path plan ending before the target position is reached, the system returns to step 1318 to detect the target position of the manipulator element and plan a path for the manipulator element to reach the target position while avoiding any obstacles.

Figure 14:
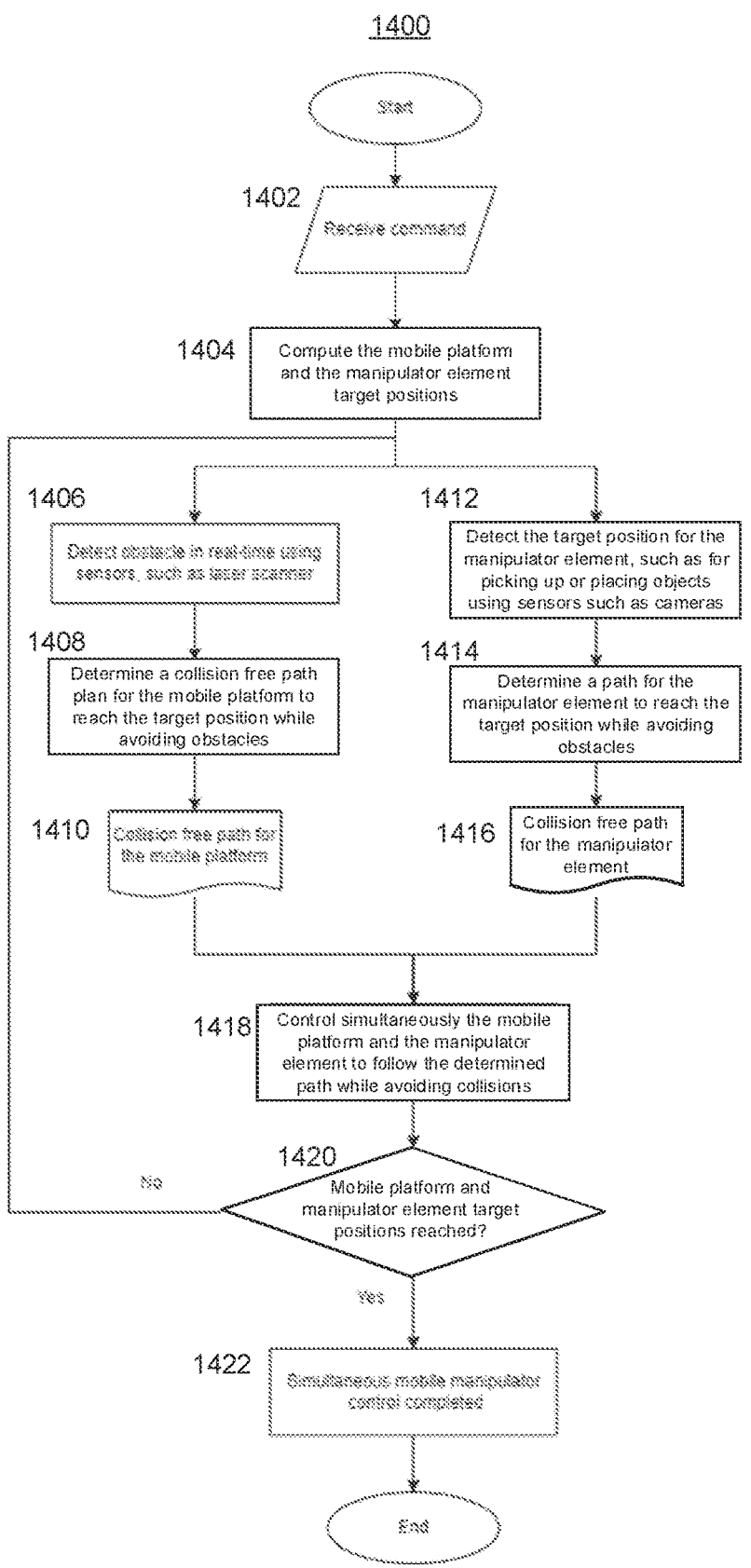
FIG. 14 depicts a flowchart of a simultaneous control method of the mobile manipulator.

FIG. 14 depicts a flowchart of a simultaneous control method 1400 of the mobile manipulator. The control method of the mobile platform and/or the manipulator base receives a command (1402), via the stored program or from a remote user, to, for example, move to a particular location to pick up or place a particular object. The mobile platform target position and the manipulator element target position are then computed (1404) for the particular location and particular object. The control method then detects obstacles in real-time using sensors (1406), determines a collision free path for the mobile platform to travel to reach the target position while avoiding any obstacles (1408), and determines the plan for the collision free path (1410), while simultaneously, detecting a target position of the manipulator element (1412) using the sensors of the manipulator element and manipulator base for the particular object, determining a path for the manipulator element to travel to reach the target position while avoiding any obstacles (1414), and determining the plan for the path (1416). The mobile platform controls the driver wheels to follow the determined collision free path and the manipulator base controls the manipulator element to follow the determined path to for example pick up or place the object (1418). Once the mobile platform and the manipulator element have reached their respective target positions (1420), the simultaneous control of the mobile manipulator is complete (1422). If the mobile platform and/or the manipulator element has not yet reached their respective target positions (1420), due to for example, an obstacle or the path plan ending before the target position is reached, the system returns to step 1406 to detect obstacles and plan a collision free path for the mobile platform to reach the target position and/or step 1412 to detect the target position of the manipulator element and plan a path for the manipulator element to reach the target position while avoiding any obstacles.

As described above, the mobile platform 100 may be used for many different applications with various attachments. In some embodiments, the mobile platform 100 may be used with the robotic arm 800 in warehouses or stores to stock shelves. The mobile platform 100 may be used to stock new items on shelves, to move items from one shelf to another, and/or to perform other warehouse or store duties. It will be appreciated that the robotic arm 800 may be used with other platforms for different applications, the manipulator base 700 may be used with other manipulator elements and/or mobile platforms for different applications, and that the mobile platform 100 may be used with other attachments or storage elements for different applications.

It will be apparent to persons skilled in the art that a number of variations and modifications can be made without departing from the scope of the invention. Although specific embodiments are described herein, it will be appreciated that modifications may be made to the embodiments without departing from the scope of the current teachings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

What is claimed is:

1. A system for performing an operation, the system comprising:

a mobile platform comprising:

a frame having a first side support, a second side support, and a rear support, wherein the first side support is on a side of the frame opposite a side of the second side support;

a first side wheel assembly coupled to the first side support;

a second side wheel assembly coupled to the second side support;

a rear wheel assembly coupled to the rear support;

the first and the second side wheel assemblies each comprising at least two wheels coupled to a wheel frame, wherein the wheel frame of the first wheel assembly is pivotally connected to the first side support and the wheel frame of the second wheel assembly is pivotally coupled to the second side support;

the rear wheel assembly comprising at least two wheels coupled to a wheel frame, wherein the wheel frame of the rear wheel assembly is pivotally connected to the rear support; and a first control system for controlling movement of the mobile platform; and a manipulator element removably coupled to the mobile platform, wherein the manipulator element is configured to removably connect to the mobile platform and to perform the operation, the manipulator element comprising:

a second control system for controlling the operation;

wherein the first control system and the second control system are configured to communicate to cause the mobile platform to move and the manipulator element to perform the operation.

2. The system of claim 1, further comprising:

a base configured to removably connect to the mobile platform, and removably connect to the manipulator element.

3. A mobile platform comprising:

a frame having a first side support, a second side support, and a rear support, wherein the first side support is on a side of the frame opposite a side of the second side support;

a first side wheel assembly coupled to the first side support;

a second side wheel assembly coupled to the second side support; and a rear wheel assembly coupled to the rear support;

wherein the first and the second side wheel assemblies each comprise at least two wheels coupled to a wheel frame, the wheel frame of the first side wheel assembly being pivotally connected to the first side support, and the wheel frame of the second side wheel assembly being pivotally connected to the second side support, wherein the rear wheel assembly comprises at least two wheels coupled to a wheel frame, the wheel frame of the rear wheel assembly being pivotally connected to the rear support.

4. The mobile platform of claim 3 further comprising:

a control system for controlling actuation of the wheels and movement of the mobile platform; and one or more sensors for detecting obstacles before and during movement of the mobile platform.

5. The mobile platform of claim 3 further comprising:

a connection port on a surface of the mobile platform configured to removably connect to a manipulator element.

6. A method of controlling a mobile platform, the method comprising:

receiving, by a processor of the mobile platform, a signal to move to a location, the mobile platform comprising wheel assemblies, wherein at least two of the wheel assemblies each comprise a drive wheel and a support wheel, the drive wheel and the support wheel being coupled to a wheel frame, the wheel frame being pivotally connected to a frame of the mobile platform;

detecting, by sensors of the mobile platform, obstacles that are present between the mobile platform and the location;

when no obstacles are detected, transmitting signals to the at least two wheel assemblies of the mobile platform to actuate the drive wheel of each of the wheel assemblies; and when obstacles are detected, determining a path for the mobile platform to avoid the obstacles.

7. The method of claim 6, further comprising:

transmitting, by the processor, a signal to a processor of a robotic arm to move the robotic arm into a predetermined position;

when the mobile platform arrives at the location, transmitting a signal to the processor of the robotic arm to perform an operation;

detecting, by sensors of the robotic arm, obstacles that are present between the robotic arm and an area for the operation;

when no obstacles are detected, actuating the robotic arm to perform the operation; and when obstacles are detected, determining movement of the robotic arm to avoid the obstacles.

8. The system of claim 1, wherein the manipulator element is a robotic arm.

9. The system of claim 1, wherein the mobile platform further comprises sensors, wherein the first control system is configured to detect, by the sensors, obstacles that are present between the mobile platform and a location for the mobile platform to move to.

10. The system of claim 1, wherein the first and the second side supports are positioned on the frame such that a weight of the mobile platform is uniformly distributed to all of the wheels.

11. The system of claim 1, wherein the mobile platform further comprises at least one bin holder on a top surface of the mobile platform.

12. The system of claim 1, wherein the manipulator element comprises sensors for detecting objects and wherein the operation is to grab a detected object.

13. The mobile platform of claim 3, further comprising a manipulator element coupled to a top surface of the frame.

14. The mobile platform of claim 3, wherein the first and the second side supports are positioned on the frame such that a weight of the mobile platform is uniformly distributed to all of the wheels.

15. The mobile platform of claim 3, further comprising at least one bin holder on a top surface of the frame.

16. The mobile platform of claim 5, wherein the manipulator element comprises sensors for detecting objects and the manipulator element is configured to grab a detected object.

17. The system of claim 1, wherein the at least two wheels of the first and the second side wheel assemblies comprise a drive wheel and a support wheel, wherein the support wheel is coupled to a first end of the wheel frame and the drive wheel is coupled to a second end of the wheel frame.

18. The mobile platform of claim 3, wherein the at least two wheels of the first and the second side wheel assemblies comprise a drive wheel and a support wheel, wherein the support wheel is coupled to a first end of the wheel frame and the drive wheel is coupled to a second end of the wheel frame.

* * * * *